United States Patent [19]

Gobran et al.

[11] Patent Number: 4,504,723
[45] Date of Patent: Mar. 12, 1985

[54] RENEWABLE BRAZING ELECTRODES

[75] Inventors: Frederick S. Gobran, Endwell; Fred E. Grospin, Binghamton; Donald G. Pittwood; Myron F. Shlatz, both of Endicott, all of N.Y.

[73] Assignee: International Business Machines Corporation, Armonk, N.Y.

[21] Appl. No.: 559,673

[22] Filed: Dec. 9, 1983

[51] Int. Cl.³ .............................................. B23K 3/00
[52] U.S. Cl. .......................... 219/85 F; 219/85 CA; 219/119; 219/234
[58] Field of Search ............... 219/119, 85 F, 85 CA, 219/234, 85 CM

[56] References Cited
U.S. PATENT DOCUMENTS

| | | | |
|---|---|---|---|
| 3,234,354 | 2/1966 | Penberg | 219/119 |
| 3,342,972 | 9/1967 | Penberg | 219/119 |
| 3,349,218 | 10/1967 | Hill | 219/119 |
| 3,435,184 | 3/1969 | Schroeppel et al. | 219/119 |

Primary Examiner—Roy N. Envall, Jr.
Assistant Examiner—Alfred S. Keve
Attorney, Agent, or Firm—Kenneth P. Johnson

[57] ABSTRACT

In apparatus for repairing printed circuit lines or attaching electrical components, a pair of brazing electrodes and holder therefor in which the electrodes can be repetitively extended to compensate for wear without necessity of removal and machining heretofore required. The holder is a part of the circuit delivering electrical power to the electrodes and makes contact with the electrodes close to the working tip to maintain uniform circuit resistance and repairs of consistent quality.

7 Claims, 6 Drawing Figures

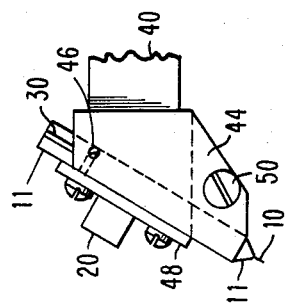
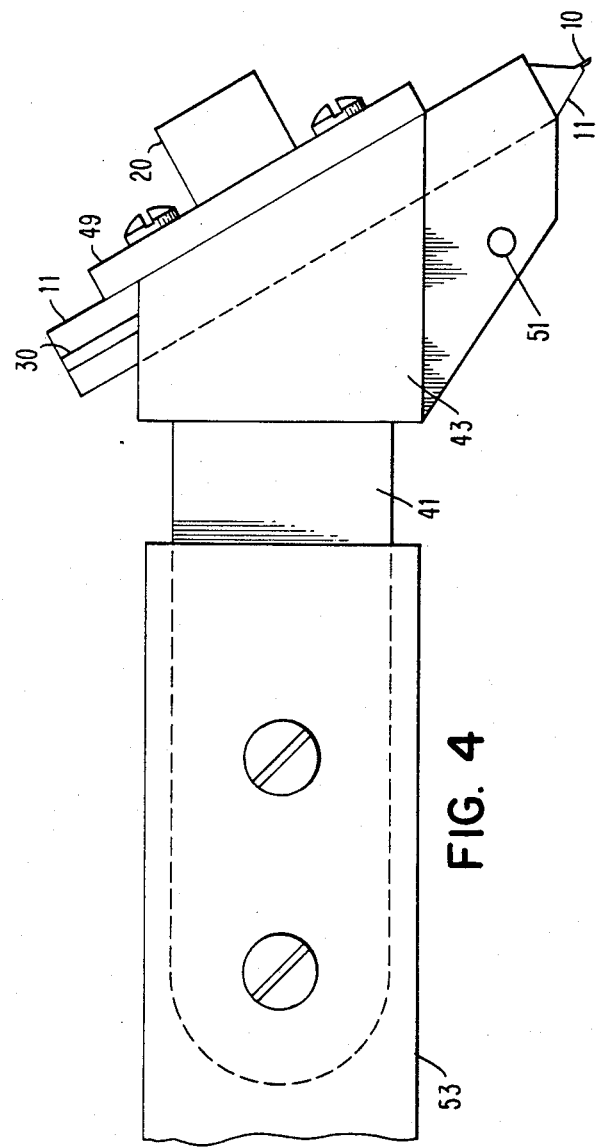
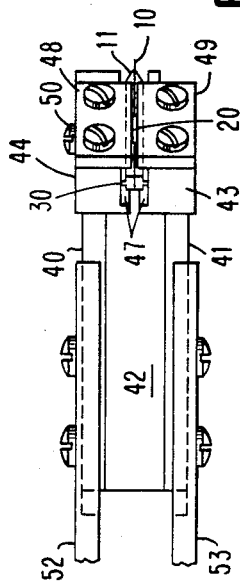

RENEWABLE BRAZING ELECTRODES

BACKGROUND OF THE INVENTION

This invention relates generally to brazing apparatus and more particularly to such apparatus especially adapted to the fabrication and connection of microcomponents and microcircuits.

The use of electrodes to effect brazed or welded connections of small electrical components and repair of conductors by localized heating is well-known. The electrodes are positioned on the joint and electrically pulsed, often through a silver solder-coated braze repair ribbon, to generate a zone of molten metal to produce the attachment. Generally, a pair of electrodes are joined on opposite sides of an insulator and then machined to a small dimension at the working tip to enable access at the precise point in which metal fusion is to occur such as shown in U.S. Pat. Nos. 3,435,184 and 3,342,972. Although the tips can be made of various wear resistant materials, erosion eventually results from the repeated use of the electrodes, and they must be either replaced or re-machined to establish good contact and operable dimensions.

The replacement of electrodes results in a high cost. Not only do the tips have to be removed and finely and carefully machined to re-establish the original dimensions, but the reinstallation of the electrodes with precision is also time consuming, demanding slow and tedious adjustment. Even after installation of replacement electrodes, dressing and polishing is frequently required to maintain the tip surface optimally aligned to the characteristics of a particular brazing machine in which they are installed.

Brazing electrodes for this application typically have to withstand temperatures in excess of 1000° F., while having a cross-sectional dimension at the tip of approximately 0.2 mm by 0.3 mm. They further have to be capable of carrying currents of 15 to 25 amps. Because of the energy handling requirements and the repeated use, the materials used as electrodes are necessarily harder, being comprised of tungsten or carbides or mixtures thereof. Because of this composition, machining of small tips on large-bodied electrodes is a difficult and time-consuming process.

OBJECTS AND SUMMARY OF THE INVENTION

Accordingly, a primary object of this invention is to provide precision brazing apparatus in which the electrodes can be simply and efficiently renewed after wear from use and which eliminates the need for frequent electrode reshaping formerly required.

Another important object of this invention is to provide brazing apparatus in which the electrodes can be readily replaced, require no removal for machining, are easily adjustable to the desired position and can be nearly entirely consumed before replacement.

A still further object of this invention is to provide brazing apparatus in which the energizing currents are applied to the electrodes at a selected location to promote fused joints of consistent quality.

The foregoing objects are attained in accordance with the invention by providing a pair of parallel electrodes assembled with an insulative adhesive material as a unit having uniform cross section and being supported within a holder means formed by a pair of mating elements that electrically connect with a respective electrode near its brazing tip. The holder means includes means for maintaining electrical separation of the mating elements and has an opening through which a feed means can advance the electrode unit. The holder elements are maintained together by releasable means by which the electrode assembly can be captured for use or released for advance by the feed means.

By making the electrodes of the desired cross-sectional dimensions and constant throughout their lengths, electrodes can be conveniently extended as wear occurs. The release or tightening of the holder either allows extension of the electrode or maintains them in position for use. The electrode advance is accomplished without removal from the holder or removing the holder from its support arm, thus eliminating a significant amount of time originally spent in removal and relocation. Further, the design of the electrical supply contact near the tip of the unitary electrode assembly assures a more uniform resistance in the current path so that the fusions are more consistent when the components are secured. The electrodes can be of different materials and resistances, thus affording some further control over the location of the point of fusion since the fusion will occur near the electrode of higher resistance.

The foregoing and other objects, features and advantages of the invention will be apparent from the following more particular description of a preferred embodiment of the invention as illustrated in the accompanying drawing.

BRIEF DESCRIPTION OF THE DRAWING

FIGS. 4, 5 and 6 are respectively elevation, plan and rear views of a braze head with which the invention is adapted for use.

DESCRIPTION OF THE PREFERRED EMBODIMENT

Figure 1:
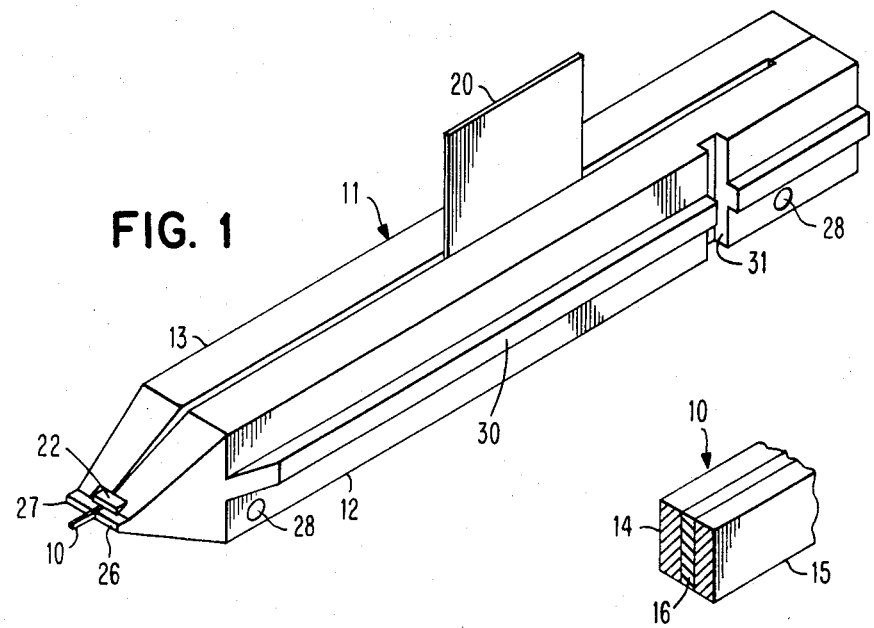
FIG. 1 is an isometric view of a brazing electrode assembly and holder constructed in accordance with the principles of the invention.
Figure 2:
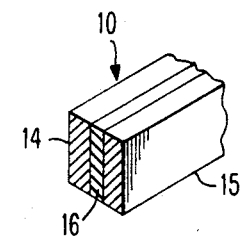
FIG. 2 is a sectional view of the electrode assembly shown in FIG. 1.
Figure 3:
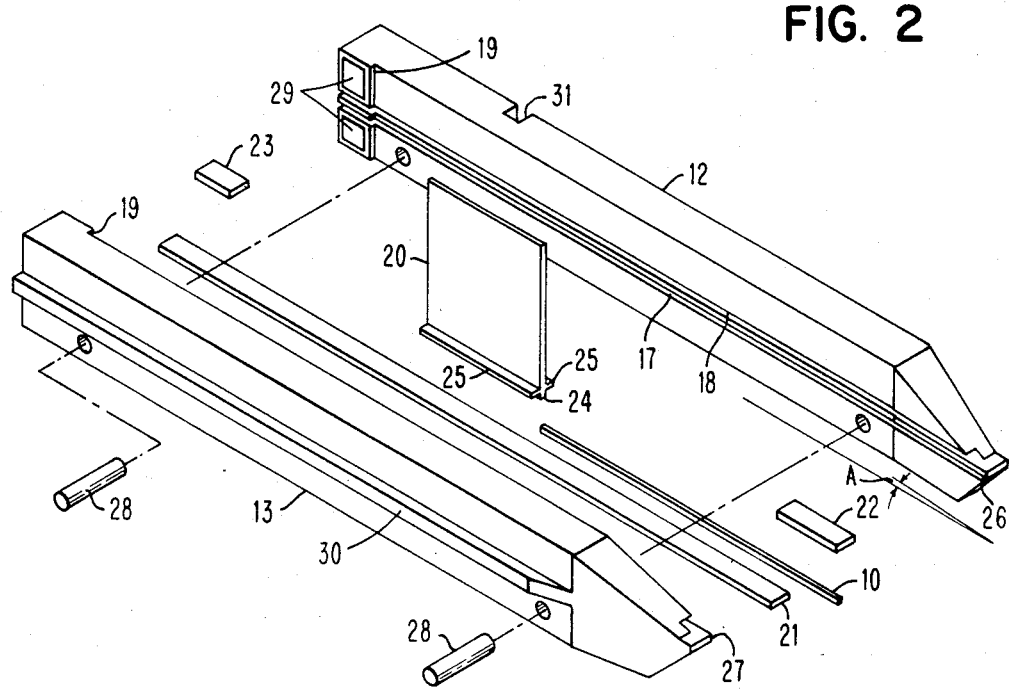
FIG. 3 is an exploded view of the electrode assembly and holder shown in FIG. 1.

Referring to FIGS. 1, 2 and 3, the invention comprises generally an electrode assembly 10 and a holder assembly 11 therefor which includes a pair of mating members 12 and 13. The electrode assembly is comprised of electrodes 14 and 15 electrically isolated from each other by an adhesive layer 16 of suitable insulator such as a combination of glass fibers and cured epoxy resin. The electrodes are made of any suitable durable material. One may be tungsten carbide and the other may be tungsten copper. During the brazing or welding operation, it is desirable to have one electrode with a resistance higher than the other to better control the location of the resulting fusion zone during brazing. The electrodes are each approximately 0.1 mm in thickness and 0.3 mm in height.

Holder members 12 and 13 are each formed of an electrically conductive material and serve as part of the current supply circuit for electrode assembly 10. Each holder member is formed with a pair of grooves 17 and 18. The adjacent surfaces of the mating holder members are relieved as can be seen by recess 19 at the rear of the electrode to separate the members and allow for movement of a feed member 20 that serves to push electrode assembly 10 to a new position. The nose portion of each holder member 12 and 13 is cut so that it angles toward electrode assembly 10 to make contact therewith only at the tip of the holder members. The total angular divergence, indicated by arrows at A, is minor, being the same as the depth of recess 19 at the rear of the members.

Members 12 and 13 when assembled, are prevented from mutual contact by the insertion of plastic insulative members 21, 22 and 23. Adequate depth in grooves 17 and 18 is provided so that insulative members 21, 22 and 23 are not compressed when the two members 12 and 13 are forced together. However, the thickness of strips 21, 22 and 23 is sufficient to provide frictional retention in the grooves. Plastic strip 21 is placed in groove 17 of each member while short portions 22 and 23 are placed in groove 18 at the opposite ends of each electrode member. Electrode assembly 10 rests on strip 21 between holder members 12 and 13 and beneath short strip 22. Thereafter, insulative dowels 28 are inserted to maintain the alignment of the holder members. Insulative tape pieces 29 are adhesively mounted on one of members 12 or 13 to maintain electrical isolation therebetween at the rear end.

Pusher member 20 having ribs 24 and 25, and being of an insulative, preferably plastic material can move along the holder members with ribs 25 engaging grooves 18 and rib 24 engaging the rear or trailing end of electrode assembly 10. When the entire assembly, as seen in FIG. 1, is in a relaxed state feeding device 20 can be moved forward toward tips 26 and 27 to extend the desired amount of electrode assembly 10 beyond the tips 26 and 27. All of the elements are held in position by compressing the two holder members 12 and 13 toward each other to thereby tighten the tips 26 and 27 against respective electrodes of assembly 10. Holder members 12 and 13 are formed with a rib 30 that serves to maintain a central clamping force on members 12 and 13 when tightened together in a larger support assembly, described below. A recess 31 is used as a positioning aid to ensure that holder 11 extends generally from its larger support a predetermined amount. Holder assembly 11 is preferably tapered as shown near tips 26 and 27 to reduce the size of holder members 12 and 13 to thereby enable better view of the electrode assembly 10 and the work to be performed during operation.

Holder assembly 11 with electrode assembly 10, during use, becomes part of a larger brazing head assembly. This latter assembly is shown in FIGS. 4, 5 and 6. A pair of arms 40, 41 are each secured to an insulative block 42 by dowels, not shown, and have in turn, secured to their ends a respective conductive block 44 and 43. Blocks 43 and 44 are separated to maintain electrical isolation and to accept holder assembly 11. Recess 31 corresponds in location to set screw 46 in FIG. 6. It will be noted from FIG. 5 that blocks 43 and 44 are formed with recesses to provide a cutout 47 in which the holder assembly 11 can be positioned. Holder assembly 11 is held in place after being positioned by a pair of plates 48, 49 suitably secured to the respective blocks 44 and 43. Plates 48 and 49 are maintained separated to prevent any electrical short circuit and also to allow the movement of feed device 20. When electrode assembly 10 is to be advanced from the tapered nose of holder assembly 11, an insulative screw 50, such as nylon, and block 44 engaging threaded hole 51 in block 43 is relaxed to allow the two holder members 12 and 13 (FIG. 1) to relieve the pressure on electrode assembly 10. Thereafter, feed member 20 can be moved downwardly to extend more of the electrode assembly from the nose of the holder assembly. Screw 50, seen in FIG. 6, is then tightened to maintain force to grip electrode assembly 10 and assure electrical contact by each holder member against its respective electrode. A torque measuring device is preferably used to assure uniform contact resistance between the electrode and holder members during use. The current supply path to the electrode is through a pair of support elements 52, 53 each in contact with a respective arm 40 and 41, respective blocks 44 and 43, holder members 12 and 13 to the electrodes 14, 15 (FIG. 1).

In use, the distance which electrode assembly 10 must be advanced can be regulated by a gauge having a groove with the correct dimension. The usual remachining of the electrodes as wear occurs is eliminated by providing the electrode assembly with uniform cross section. Some minor lapping by a hand tool may be required to assure that the electrodes have the appropriately angled face to maintain uniform contact with the material being brazed. Electrode assemblies can be nearly entirely consumed before replacement is required. The long length of the original electrode assemblies provide a significant advantage in that an electrode life of many times that of brazing tools known heretofore. A further advantage of the electrode assembly is gained by electrically contacting the electrodes near the tip of the electrode assembly through holder members 12 and 13. Connection at this point assures a more constant resistance path and brazes or welds of consistent quality.

It will be apparent from the foregoing that the electrode assembly and holder means can be adapted to various brazing and welding requirements by changing component dimensions and current supply capabilities. Further, the electrode assembly need not be a unitary device but the two electrodes and an insulative separator can be separate, individual elements, if required.

While the invention has been particularly shown and described with reference to a preferred embodiment thereof, it will be understood by those skilled in the art that various changes in form and detail may be made therein without departing from the spirit and scope of the invention.

What is claimed:

1. Bonding apparatus comprising:
   electrode holder means having a pair of electrically conductive, mating members mutually insulated from each other and formed with a channel therebetween for receiving electrode means therein;
   composite electrode means for insertion in said channel, said electrode means being formed by a pair of conductive strips insulated from each other and being movable along said channel;
   means for releasably securing said members together with said electrode therebetween and each said member being in electrical contact with a respective one of said strips; and
   feed means in said holder in engagement with one end of said electrode means and operable when said securing means is released for moving said electrode means along said channel.

2. Apparatus as described in claim 1 wherein said strips are different materials and different resistances.

3. Apparatus as described in claim 1 wherein one end of said holder means is tapered toward said composite electrode means.

4. Apparatus as described in claim 1 wherein said strips are joined by a dielectric adhesive.

5. Apparatus as described in claim 1 wherein said composite electrode means has a uniform cross section throughout its length.

6. Apparatus as described in claim 1 wherein said mating members each have at least one recess therein engageable by said feed means when moving said electrode.

7. Apparatus as described in claim 1 wherein said mating members are each tapered at one end thereof and engage said electrode means at a respective conductive strip on opposite sides of said electrode means at said tapered end.

* * * * *